July 7, 1959    A. G. VANDERBECK    2,893,518
TROLLEY ANCHORING DEVICE
Filed Sept. 4, 1956
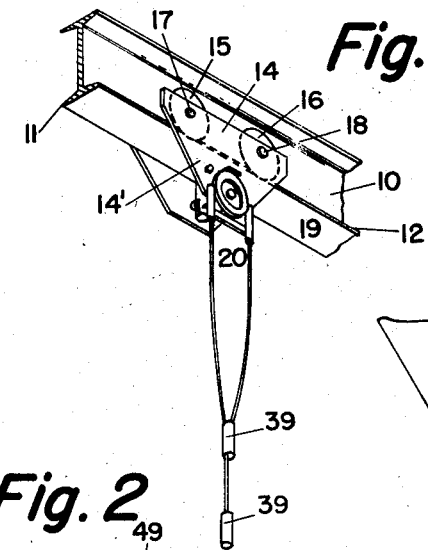
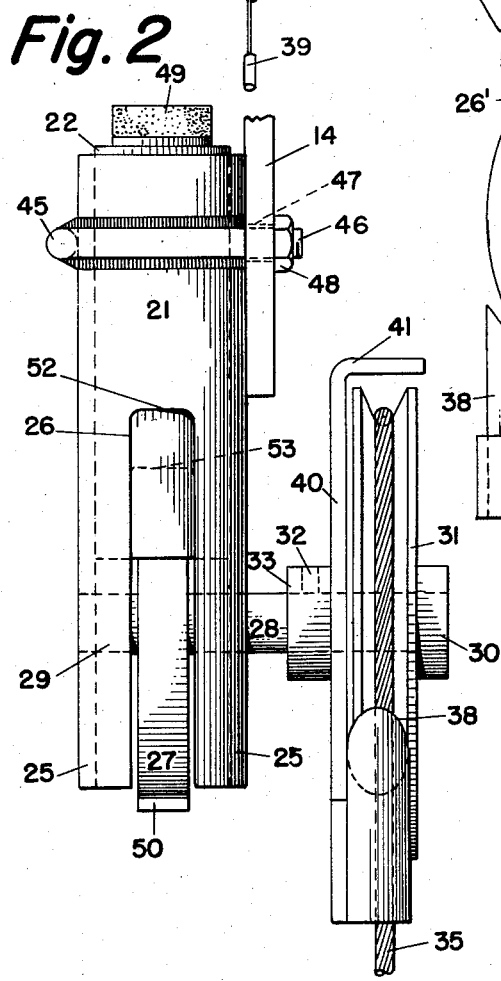
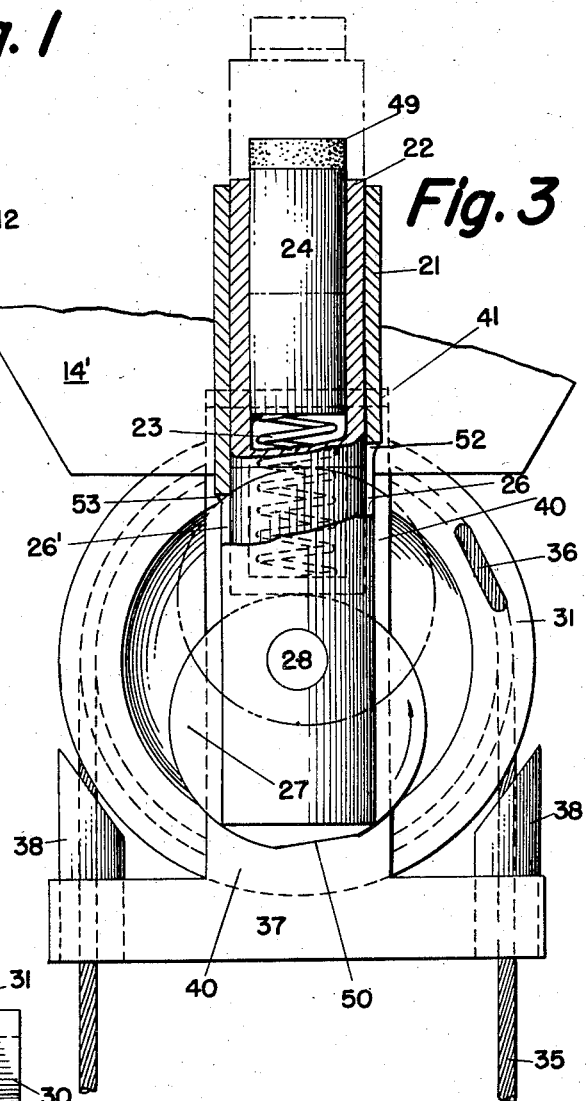
INVENTOR.
ALFRED G. VANDERBECK
BY
ATTORNEY United States Patent Office 2,893,518
Patented July 7, 1959

2,893,518

TROLLEY ANCHORING DEVICE

Alfred G. Vanderbeck, Wayne, Pa.

Application September 4, 1956, Serial No. 607,863

4 Claims. (Cl. 188—42)

My invention relates to a braking or anchoring device for trolleys of the type which have wheels mounted for rotation along the upper surface of monorails. In particular, the invention is concerned with such trolleys which carry chain or cable hoists or other conveying devices and are moved manually under the control of an operator.

The invention is especially useful in connection with the lifting and transporting of material about an industrial plant by an overhead trolley. In such devices the weight carrying cables or chains which depend from the trolley are used by the operator to move the trolley along the monorail surfaces, and a problem is presented in maintaining the trolley at a desired fixed location after it has been moved. This is due, at least in part, to the weight of the work or suspended chains or cables, or to the momentum of this structure which exerts a force and causes the trolley to continue in motion after the trolley is moved to a new position by the operator and then the trolley movement stopped by the operator.

Particular difficulty is also experienced when using powered hoists since it is necessary to supply power to the hoist by a power cable as the hoist moves along with the trolley. The power cable, which is usually carried by a spring reel, unwinds as the trolley advances, or is moved, and the weight or drag of the extended cable, alone or along with the force of the spring reel, exerts such a strong return pulling action that it is necessary to positively anchor the trolley in the new position to which it has been advanced. The problem is particularly emphasized when the trolley wheels are provided with bearings as in the use of newer equipment or when the monorail is inclined in either direction of travel.

It is an object of the invention to provide means for an overhead trolley of the type referred to which will insure anchoring the trolley and associated structure in a fixed position relative to the monorail on which the trolley is mounted.

Another object is to provide an anchoring device which prevents movement of the trolley unless it is released by the operator.

Another object is to provide such a device which is easily and readily manipulated by the operator at the ground level.

Another object is in the provision of a cam actuated anchoring device which insures a positive locking operation.

Still another object is to provide a rotatable cam anchoring device which permits locking only in one direction of rotation and its release only in its other direction of rotation.

The above objects and other incidental objects will become apparent from the following detailed description of the invention read in the light of the drawings in which:

Fig. 1 is a view in perspective showing the general assembly of a monorail, trolley and anchoring device;

Fig. 2 is a view in end elevation showing the assembly of the anchoring device and operating mechanism therefor; and Fig. 3 is a sectional view of the anchoring device to show its details of construction with its operating mechanism and auxiliary structure shown in elevation.

Referring to Fig. 1 of the drawings the monorail 10 is shown in the form of an I-beam having opposed lower lateral flanges 11 and 12. The I-beam will be secured a suitable distance above the floor level of the plant and will be of substantial length in order that a single trolley may serve different areas of the plant by moving or conveying material from one location to another.

The trolley comprises a pair of metal side plates 14—14 which are generally similar in size and shape and cooperating pairs of rollers or wheels 15 and 16. Shafts or axles 17 and 18 mount the respective pairs of wheels 15 and 16 so that (although not shown) a wheel 15 and a wheel 16 are mounted for rotation on the upper surfaces of the respective flanges 11 and 12 of the I-beam. The plates 14—14 have their upper portions mounted at the ends of the shafts 17 and 18 and provide depending end portions 14'—14' which extend below the lower surface 19 of the I-beam. The structure above described is well-known in the art, and the present invention is directed to the anchoring structure generally indicated at 20 in Fig. 1 and which will be described in detail in connection with Figs. 2 and 3.

The anchoring device 20 comprises an outer cylinder 21 and a telescoping inner cylinder 22. The inner cylinder has a closed lower end and an open upper end and houses a cooperating coil spring 23 and locking or anchoring plunger 24 which are disposed in vertical alignment and with the lower end of the spring contacting the closed lower end of the inner cylinder and the upper end of the spring contacting the lower end of the locking plunger 24.

The outer cylinder 21 is bifurcated axially in its lower end portion providing depending legs 25—25 with front and rear spaces 26 and 26' therebetween. A cam 27 is disposed between the legs 25—25 and is fixed to a shaft 28. The shaft 28 has one end portion 29 rotatably mounted in apertures or bearings in the legs 25—25 to provide for rotative movement of the cam 27 through the spaces 26—26' and its other end portion 30 extending laterally of one of the legs.

An actuator in the form of a pulley 31 is removably fixed to the end portion 30 of the shaft by means of a locking screw 32 which extends through the pulley hub 33 to contact the end portion 30 of the shaft. The pulley 31 is rotated by means of a cable 35 which is disposed and wrapped in the circumferential groove of the pulley and is also secured to the pulley by being threaded through openings in one of its rims as indicated at 36 in Fig. 3.

A spreader or carrier 37 is provided for the cable and is mounted on the pulley hub 33 and provided with vertical tubular guides 38—38 while the cable ends are provided with grips 39—39 arranged preferably as shown in Fig. 1 for the use of the operator in manually moving the trolley and for operating the cam. The cable spreader 37 is provided with an upstanding arm 40 which has a horizontal extension 41 thereon and positioned in slightly spaced relation with the rim of the pulley 31 and functions to retain the cable 35 in place within the circumferential groove.

The anchoring device may be secured to one of the side plates 14 by means, for example, as shown in Fig. 2, of a U-shaped clamp 45 which has its ends 46 screw threaded and extending through apertures 47 in the side plate 14 for the reception of nuts 48.

The cam 27 and the spaces 26 and 26' between the legs 25—25 of the outer cylinder are so relatively designed that when the cam is in the position shown in full lines in Fig. 3, the inner cylinder 22, the spring 23 and the friction shoe 49 are in the released position. When in the position shown in broken lines, these members are in the braking or anchoring position and the friction shoe 49 of the braking member or plunger 24 will be fixed in locking engagement with the undersurface 19 of the I-beam.

To this end, for example, the cam 25 is provided with a dwell portion 50 and the cam is mounted eccentrically so that the dwell portion is located generally at the lower end of the cam when in the release position and moves through approximately an arc of 180° to its braking position. The spring 23 is designed so that when the cam dwell portion 50 is in its anchoring position, the spring 23 will be greatly compressed and by proper selection of the spring, the force exerted on the braking plunger 24 will be sufficient to positively anchor any trolley with which the device is used.

To complement the cam design, the spaces 26 and 26', which as shown are open at their lower end, are provided respectively with a front edge 52 and a rear edge 53 located respectively in upper and lower horizontal planes. The front edge 52 is arranged to permit free rotation of the cam 27 within the space 26, but the rear edge 53 being in the lower plane provides a stop or abutment for the peripheral surface of the cam which due to its eccentric mounting can only be rotated in one direction, which is counterclockwise in this preferred embodiment. Thus, the edge 53 prevents further movement of the cam in this direction of rotation at approximately the instant that the lower end of the inner cylinder 22 is raised and is completely seated in the dwell portion 50 of the cam when the cable 39 is operated to anchor the trolley and the braking plunger 24 and coacting elements are in and remain in the fixed locking or anchoring position until the operator releases the cam by proper manipulation of the cable 35.

When the anchoring device is applied to existing trolleys, it is contemplated that the U-shaped clamp 45 will be welded to the outer cylinder 21 as shown in Fig. 2. When a new trolley is equipped with the device, it may be expedient to weld the outer cylinder 21 directly to one of the side plates 14. In either manner of assembly, however, the purpose is to prevent relative movement between the anchoring device and the trolley structure in order to insure a positive locking action.

I claim:

1. In combination with an overhead flanged rail, a trolley having a vertical side plate with wheel means journalled thereto and rotatable along the upper face of the rail flange, a vertically disposed cylindrical housing fixedly mounted to said side plate and having an upper open end disposed below and adjacent the lower face of the rail flange, a vertically movable plunger within the housing having an upper anchoring end disposed adjacent the open end of the housing and a lower end providing a space with the lower end of the housing, a transverse shaft rotatably mounted to the housing providing an inner end portion which is movable within the housing adjacent its lower end and an outer end portion, means within said space for urging the anchoring face of the plunger in contact with the lower face of the flange rail, said means comprising a compressible coil spring having its upper end positioned in abutting relation with the lower end of the plunger and a movable actuator, said actuator being positioned on and supported by said inner end portion of the transverse shaft and supporting said compressible coil spring and operator means secured to said outer end portion of the transverse shaft whereby rotative movement of the shaft is effected to compress the coil spring through said actuator to urge the plunger upwardly and maintain the achoring face of the plunger in engagement with the lower face of the rail flange.

2. In combination with an overhead flanged rail, a trolley having a vertical side plate with wheel means journalled thereto and rotatable along the upper face of the rail flange, a nested pair of vertically disposed inner and outer cylinders, means fixedly mounting the outer of the nested cylinders to said side plate and positioning the nested cylinders below and adjacent the lower face of the rail flange, said inner cylinder being vertically movable within the outer cylinder, a compressible coil spring mounted within the inner cylinder, an anchoring plunger within the inner cylinder supported by said spring and having an anchoring surface at its upper end, a transverse shaft rotatably mounted to the outer cylinder and having an inner end portion below the inner cylinder and an outer end portion exteriorly of the outer cylinder, a cam carried by the inner end of the transverse shaft having a peripheral surface abutting the lower end of the inner cylinder, operator means carried by the outer end portion of the shaft which is effective to rotate the shaft and urge the inner cylinder, spring and plunger vertically of the outer cylinder until said anchoring surface of the plunger contacts the under surface of the overhead rail to maintain the trolley in a stationary position.

3. In combination with an overhead flanged rail, a trolley having a vertical side plate with wheel means journalled thereto and rotatable along the upper face of the rail flange, a nested telescoping pair of inner and outer cylinders, means fixedly mounting the outer of the nested cylinders to said side plate and positioning the nested cylinders below and adjacent the lower face of the rail flange, a compressible coil spring mounted within the inner cylinder, a movable anchoring plunger within the inner cylinder supported by said spring and having an anchoring surface at its upper end, said outer cylinder having spaced depending leg portions providing vertical slots, a transverse shaft rotatably mounted to said leg portions having an inner end portion and an outer end portion, a cam mounted on said inner end portion of the shaft and aligned with said slots, said cam having a peripheral surface abutting the lower end of the inner cylinder, operator means fixed to the outer end portion of the shaft for rotating the cam, said cam upon its initial movement in one direction being effective to urge the inner cylinder vertically until the anchoring surface of the plunger is in contact with the under surface of the overhead rail and upon its further rotation in the same direction to compress the spring and cause it to exert an upward force on the plunger sufficient to maintain the trolley in anchored position and said operator means comprising a pulley and cable means.

4. The combination of claim 3 further characterized by one of said slots providing an abutment on the outer cylinder, which is operative to limit the rotative movement of the cam in said one direction when the trolley is anchored.

References Cited in the file of this patent

UNITED STATES PATENTS

| | | |
|---|---|---|
| 654,687 | Suter | July 31, 1900 |
| 1,183,565 | Howells | May 16, 1916 |
| 1,972,367 | Willard | Sept. 4, 1934 |
| 2,219,196 | Nystrom et al. | Oct. 22, 1940 |